March 12, 1940.    I. COWLES    2,193,224
AUTOMATIC SPEED LIMITING MECHANISM FOR AUTOMOTIVE VEHICLES
Filed Feb. 11, 1938
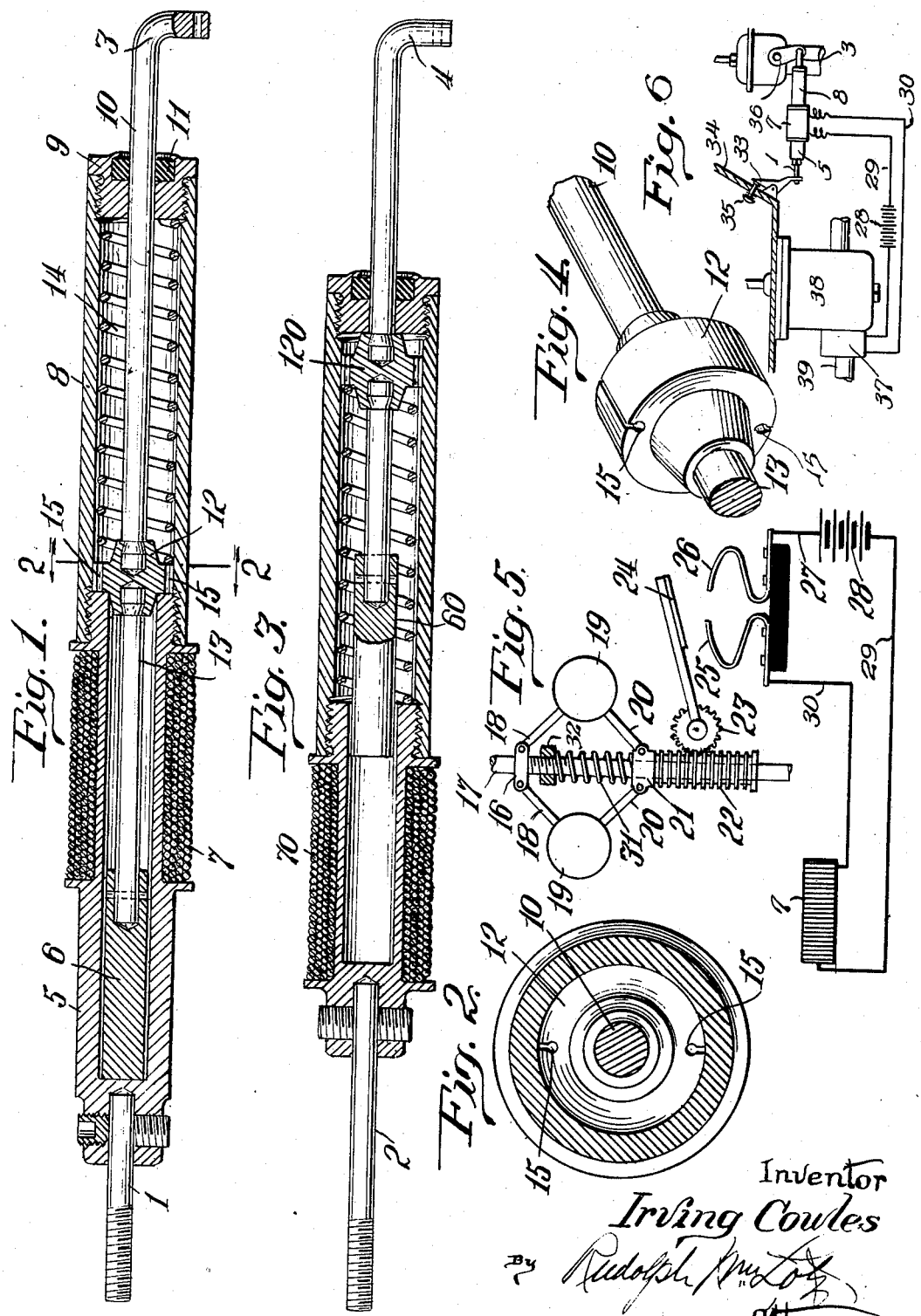
Inventor
Irving Cowles Patented Mar. 12, 1940

2,193,224

UNITED STATES PATENT OFFICE 2,193,224

AUTOMATIC SPEED LIMITING MECHANISM FOR AUTOMOTIVE VEHICLES

Irving Cowles, Detroit, Mich., assignor to said Cowles and Rudolph W. Lotz, Chicago, Ill., as successor cotrustees of Utility Patents Trust Application February 11, 1938, Serial No. 190,111

7 Claims. (Cl. 180—82)

The essential object of the present invention is to provide simple, cheap and efficient means for limiting the speed of an automotive vehicle without limiting the engine speed of the same in order that the engine may operate at maximum speed when the change-speed gear set of the vehicle is set for low speed vehicle travel as, for example, in ascending steep grades, traveling through mud, sand, and the like.

A further object of the invention is to provide a device of the character designated which constitutes a substitute for the rod commonly used to connect the butterfly valve of the carbureter with the accelerator plunger of the vehicle so that the device may be installed relatively easily in existing vehicles, the only other change required being the installation of automatic electric circuit control means for the said device.

Obviously, under certain conditions of travel, such as climbing steep and long grades under heavy loads, as in the case of motor propelled trucks, it is essential that the engine should operate at full speed under low speed gear conditions whereas safe driving under heavy traffic and other road conditions renders wise the precaution of limiting the maximum speed at which the vehicle may travel. The present invention is designed to meet all of the necessary conditions incident to motor vehicle travel to promote safety without reducing maximum power development of the engine for purposes other than the attainment of higher speed travel than the promotion of reasonable safety dictates.

To this end and in contrast to prior art disclosures known to me, the present invention consists broadly in providing a vehicle speed limiting means operatively associated directly or indirectly with and controlled by the R. P. M. of one of the vehicle wheels.

Suitable embodiments of the invention are illustrated in the accompanying drawing, wherein:

Fig. 1 is a central longitudinal sectional view of an elongatable device constructed in accordance with the invention.

Fig. 2 is a transverse sectional view of the same on an enlarged scale taken on the line 2—2 of Fig. 1.

Fig. 3 is a view similar to Fig. 1 showing a contractible device constructed in accordance with the invention.

Fig. 4 is a perspective view of the pistons of the devices shown in Figs. 1 and 2.

Fig. 5 is a diagrammatic view of a centrifugal governor actuated circuit control device adapted to be employed in connection with the structures of Figs. 1 and 2.

Fig. 6 is a diagrammatic view showing the device of Fig. 1 connected with the accelerator lever and the engine control valve of an automotive vehicle.

The respective devices of Figs. 1 and 3 take the place of rods connecting the accelerator plunger of an automotive vehicle with the butterfly valve of the carbureter, the terminal rods 1 and 2, respectively, of said devices being suitably attached to or connected with the accelerator plunger or a part actuated thereby. The lateral projections 3 and 4 of said respective devices are adapted to be attached to the cranks of the stems of the butterfly valves of the carbureters, the device of Fig. 1 being adapted to be attached to the butterfly valve which is closed by moving the projection 3 to the right, whereas, in the structure of Fig. 3 the projection 4 is attached to the crank of the stem of a butterfly valve which is closed by moving the projection 4 to the left.

In the instance of Fig. 1 the device comprises a hollow cylindrical left hand end portion 5 which is adapted to receive the spring urged armature 6 of the solenoid 7 which is mounted between the ends of the generally tubular structure which includes the cylinder 8 having fluid tight connection with the spool of the solenoid 7 and which is equipped with a fluid-tight closure head 9 through which the rod 10 equipped with a projection 3 extends, a packing gland 11 being mounted in the head 9 to assure a fluid-tight joint with the said rod 10.

Mounted at the inner end of the rod 10 is a piston 12 which is connected with a rod 13 secured to the armature 6 of the solenoid. The light compression spring 14 mounted in the cylinder 8 bears against the head 9 and the piston 12 to hold the latter normally at the inner limit of its movement as shown in Fig. 1.

The piston 12 is equipped with one or more bleed openings 15 through which air is adapted to pass from the cylinder into the space at the left hand end of the piston 12 as the latter moves toward the head 9, the said cylinder 8 constituting the substantial equivalent of a dash pot.

In Fig. 5 there is shown a centrifugal governor which may be mounted upon any one of the shafts driven from the change-speed gear set of the vehicle. The said governor includes a collar 16 rigid with the shaft 17 and which is connected by means of links 18 in a well-known manner with the spheres or balls 19, the latter being connected by means of links 20 with the collar 21 which is suitably connected with the cylindrical rack bar sleeve 22 slidable, and also preferably rotatable on said shaft 17. The rack 22 meshes with the spur-gear pinion 23, mounted upon a fixed pivot which carries the bridge member 24 of an electric switch which includes also the respective terminals 25 and 26, the latter being connected by means of wire 27 with the source of current 28, which may be the magneto of the power plant, the latter being also connected by wire 29 with one terminal of the solenoid 7. The switch terminal 25 is connected by means of wire 30 with the other terminal of the solenoid 7.

By means of the spring 31, the rack bar 22 is normally held in a position wherein the switch member 24 is out of contact with the terminals 25 and 26. The governor may be so adjusted, as, for example, by means of an adjusting nut 32 on the shaft 17, disposed between the collar 16 and the spring 31, for example, that as soon as the vehicle speed exceeds fifty M. P. H., the rack-bar will be moved responsively to the action of the governor to a position wherein the circuit through the solenoid 7 is closed. When this occurs the armature 6 will be thrown toward the right against the action of the spring 14, thus causing the butterfly valve of the carburetor to close gradually, due to the dash pot action above referred to, thereby obviously effecting a decrease in engine speed.

However, if the change speed gear set is operating to cause the vehicle to travel more slowly without reducing engine speed, then obviously, the maximum engine speed may be obtained to exert maximum power on the running gear of the vehicle without in any manner affecting the operation of the device to limit such engine speed.

The device of Fig. 3 operates in exactly the same manner as the device of Fig. 1 except that the piston 120 is normally disposed at the outer or right hand end portion of the cylinder and is moved to the left by operation of the solenoid armature 60 when the circuit through the solenoid 70 is closed, thereby also closing the butterfly valve of the carburetor to reduce engine speed.

An exemplary connection of the device of Fig. 1 is illustrated diagrammatically in Fig. 6 wherein the rod 1 is connected with the rocking lever 33 mounted upon the front lower face of the floor board 34 of an automotive vehicle for actuation by the reciprocable plunger 35 projecting through said floor board. The rod 3 is connected with the engine speed control valve actuating lever 36 so that upon pressing the driver's foot against the plunger 35 the device of Fig. 1 will be moved to the left and, in this instance, the valve controlled by the lever 36 will be swung to further open position to increase engine speed. The governor of Fig. 5 is disposed in the casing 37 at the left side of the change-speed gear casing 38 and controls the circuit through the solenoid 7 for effecting closure of said circuit when the shaft 39, to which the said governor is geared, attains the predetermined maximum speed for which the governor is adjusted.

The device of the present invention is obviously very simple and operates efficiently to control vehicle speed without in any manner affecting engine speed when the engine is geared to drive the vehicle at low speed, but with maximum power, as aforesaid.

It is very important also that the speed of operation of the piston responsively to both the electric and spring actuations thereof should be relatively slow in order that the variations in engine speed may not be too sudden, as that would be dangerous under certain road conditions, as on wet or icy pavements on the one hand, and undue shocks or stresses on the engine and gearing on the other.

While the invention is illustrated and described as applied to automotive vehicles, it may be equally well adapted for other power installations wherein the speed control should be such as not to limit maximum engine speed and power generation in order to carry overload on the engine driven mechanism as, for example, in hoisting and excavating machinery.

I claim as my invention:

1. A device for the purpose set forth comprising a tubular casing, means for connecting the same at one end with the accelerator mechanism of the power plant of an automotive vehicle, a reciprocable piston in said casing, a spring for maintaining said piston normally at one limit of its movement, electrically responsive means associated with said piston for actuating the same counter to said spring, a piston rod connected to said piston and adapted for connection with means for controlling engine operation independently of said accelerator mechanism, a normally open electric circuit through said electrically responsive means, and automatic means for opening and closing said circuit operatively connected with and actuated by the running gear of the vehicle.

2. A device for the purpose set forth comprising a tubular casing, means for connecting the same at one end with the accelerator mechanism of the power plant of an automotive vehicle, a reciprocable piston in said casing, a spring for maintaining said piston normally at one limit of its movement, a solenoid having its armature connected with said piston for actuating the latter counter to said spring, a piston rod connected to said piston and adapted for connection with means for controlling engine operation independently of said accelerator mechanism, a normally open circuit through said solenoid, a switch controlling said circuit, and a mechanism actuated by the running gear of the vehicle for actuating said switch to close the said circuit as the vehicle speed exceeds a predetermined maximum and reopening said circuit as the vehicle speed decreases to the said predetermined maximum.

3. A device for the purpose set forth comprising a tubular casing, means for connecting the same at one end with the accelerator mechanism of the power plant of an automotive vehicle, a reciprocable piston in said casing, a spring for maintaining said piston normally at one limit of its movement, electrically responsive means associated with said piston for actuating the same counter to said spring, a piston rod connected to said piston and adapted for connection with means for controlling engine operation independently of said accelerator mechanism, a normally open electric circuit through said electrically responsive means, and automatic means for opening and closing said circuit operatively connected with and actuated by the running gear of the vehicle and means associated with said piston for controlling the speed of its movements.

4. In an internal combustion engine-driven vehicle, an engine speed control valve, an accelerator lever, a cylinder and piston reciprocable relatively to each other interposed between said lever and said valve and constituting a variable length connection between them, a spring for normally maintaining the said piston at one limit of its movement relatively to said cylinder, said piston including an armature and said cylinder including a solenoid, a normally open circuit through said solenoid operatively connected with and controlled by the speed of travel of the vehicle and, when closed, actuating said piston against the action of said spring for moving said valve to an engine slowing position.

5. In an internal combustion engine-driven vehicle, an engine speed control valve, an accelerator lever, a cylinder and piston reciprocable relatively to each other interposed between said lever and said valve and constituting a variable length connection between them, a spring for normally maintaining the said piston at one limit of its movement relatively to said cylinder, said piston including an armature and said cylinder including a solenoid, a normally open circuit through said solenoid operatively connected with and controlled by the speed of travel of the vehicle and, when closed, actuating said piston against the action of said spring for moving said valve to an engine slowing position, and means associated with said piston and cylinder and disposed within the latter for yieldingly resisting relative reciprocable movements of said piston and cylinder.

6. In an internal combustion engine-driven vehicle, the combination with a engine speed control valve, an accelerator lever, and a governor connected with the running gear for actuation thereby, of a cylinder equipped at one end with a solenoid axially aligned therewith, a piston equipped with a rod and an armature rigid therewith reciprocably mounted within the cylinder, a spring acting to maintain the piston normally at one limit of its movement, and an electric circuit through said solenoid controlled by said governor, said cylinder and piston rod interposed between the accelerator lever and said valve with one thereof connected to said lever and the other thereof with said valve, said circuit being adapted to be closed automatically by said governor as the vehicle speed attains a predetermined maximum to effect actuation of said piston against said spring for moving said valve to engine speed reducing position.

7. In an internal combustion engine-driven vehicle, the combination with an engine speed control valve, and accelerator lever, and a governor connected with the running gear for actuation thereby, of a cylinder equipped at one end with a solenoid axially aligned therewith, a piston equipped with a rod and an armature rigid therewith reciprocably mounted within the cylinder, a spring acting to maintain the piston normally at one limit of its movement, means for yieldingly resisting movement of the piston relatively to the cylinder, and an electric circuit through said solenoid controlled by said governor, said cylinder and piston rod interposed between the accelerator lever and said valve with one thereof connected to said lever and the other thereof with said valve, said circuit adapted to be closed automatically by said governor as the vehicle speed attains a predetermined maximum to effect actuation of said piston against said spring for moving said valve to engine speed reducing position.

IRVING COWLES.